United States Patent [19]

Merrell

[11] 3,821,470

[45] June 28, 1974

[54] PHASE CORRECTION FOR HORIZONTAL OSCILLATOR IN CMOS FORM

[75] Inventor: Richard G. Merrell, Darien, Ill.

[73] Assignee: Zenith Radio Corporation, Chicago, Ill.

[22] Filed: May 21, 1973

[21] Appl. No.: 362,647

[52] U.S. Cl. ............ 178/69.5 TV, 331/20, 331/27, 331/34, 331/113 R, 331/177 R

[51] Int. Cl. ............ H04n 5/08

[58] Field of Search ............ 178/69.5 TV, 7.3 R; 331/1 A, 8, 17, 20, 27

[56] References Cited

UNITED STATES PATENTS

| | | | |
|---|---|---|---|
| 2,521,058 | 9/1950 | Goldberg | 331/27 |
| 3,205,452 | 9/1965 | Saudinaites | 178/69.5 TV |
| 3,567,860 | 3/1971 | Oliver et al. | 178/69.51 TV |

OTHER PUBLICATIONS

Yamamoto, Keisuke, Automatic Synchronizing Systems with ICs; J. Inst. T.V. Engrs. of Japan, Vol. 26, No. 5(1972) 375–380.

*Primary Examiner*—Robert L. Richardson
*Assistant Examiner*—Mitchell Saffian
*Attorney, Agent, or Firm*—John J. Pederson; Nicholas A. Camasto

[57] ABSTRACT

A horizontal oscillator system in CMOS form, for use in a television receiver, comprising an oscillator connected to a divider-buffer stage and a phase comparator; the output of the divider-buffer stage is applied to the horizontal drive circuitry of the television receiver and the flyback signal produced by the horizontal drive circuitry is coupled back to the phase comparator, which includes a positive-logic channel and a negative-logic channel terminating in a complementary pair of MOS-FET's. The phase comparator compares the flyback signal with a horizontal synchronizing pulse derived from the sync separator of the television receiver, and develops a control voltage varying in amplitude in response to changes in phase of the flyback signal and the horizontal sync pulse. The control voltage is applied to the oscillator so as to control the operating frequency and thereby maintain the oscillator frequency in synchronism with the horizontal sync pulse.

7 Claims, 2 Drawing Figures

PHASE CORRECTION FOR HORIZONTAL OSCILLATOR IN CMOS FORM

BACKGROUND OF THE INVENTION

The present invention relates to the field of horizontal control circuits in television receivers and more particularly to a horizontal oscillator with associated phase control circuitry in CMOS (complementary-metal-oxide-semiconductor) form.

In many instances, it is necessary to synchronize an oscillator with an externally produced synchronizing signal. For examle, in television receivers of the modulated carrier wave type, it is necessary to synchronize the scanning oscillators of the receiver with the scanning generators of the transmitter by means of a synchronizing signal that is encoded on the received television signal.

Previous horizontal control circuits have utilized balanced phase detectors to provide discrimination against unwanted noise impulses which may be present on the synchronizing pulse signal. The received synchronizing pulse signal is compared with a flyback pulse signal derived from the sweep output of the drive circuitry that is driven by the oscillator. A control voltage is produced which varies according to the phase relationship of the sync pulse and the flyback pulse. The control voltage is then applied to the oscillator to control its operating frequency so as to maintain synchronism with the received sync pulses. In these arrangements, it has been necessary to utilize tapped transformers or other balanced circuit equivalents with standard rectifier components to supply the required balanced input voltages to the phase detector. Also, horizontal oscillators have typically been inductively-capacitively tuned.

It is desirable to implement the horizontal system without the use of induction turning or transformers for eiither the phase detector or the oscillator, so that Complementary-Metal-Oxide-Semiconductor (CMOS) techniques and CMOS compatible components may be utilized. Most of the horizontal control circuitry may then be incorporated in a CMOS chip. Special CMOS chips may be designed, including both horizontal and vertical circuits, with a resulting saving of space and cost.

OBJECTS OF THE INVENTION

It is a principal object of the present invention, therefore, to provide a horizontal oscillator with associated phase control circuitry that may be implemented by CMOS and compatible CMOS components.

Another object is to provide a horizontal oscillator with associated phase control circuitry that may be incorporated entirely or primarily on a CMOS chip.

Another object is to provide a CMOS horizontal oscillator with associated phase control circuitry that requires fewer parts than conventional circuits.

SUMMARY OF THE INVENTION

Accordingly, the invention relates to a horizontal oscillator system for a television receiver of the kind that includes a synchronizing signal separator which derives a horizontal synchronizing pulse signal having a scanning frequency H from a received telecast. The television receiver also includes horizontal drive circuitry for controlling the horizontal scanning in an image reproducer and a horizontal oscillator system for actuating the horizontal drive circuitry in synchronism with the synchronizing pulse signal. The horizontal oscillator system comprises oscillator means tuned approximately to a given operating frequency and having a voltage-variable resistance means for varying the operating frequency of the oscillator in response to variations in an applied control voltage, and a phase comparator including a negative-logic channel and a positive-logic channel. The output of the oscillator means is connected so as to drive the horizontal drive circuitry at a frequency H. The horizontal drive circuitry produces a horizontal flyback signal which is applied to one input of the phase comparator. Applied to the other input of the phase comparator is the synchronizing pulse signal that is derived from the sync signal separator. The phase comparator also includes output means to combine the signals of the two channels to develop a control voltage varying in amplitude in response to changes in relative frequency and phase of the flyback signal and the synchronizing pulse signal. Means are also provided to apply this control voltage to the voltage-variable resistance means of the oscillator. The horizontal oscillator system is constructed as a single-chip CMOS circuit with external resistors and capacitor implemented by CMOS-compatible components.

Other objects will appear from time to time in the ensuing specification, drawings and claims.

BRIEF DESCRIPTION OF THE DRAWINGS

The features of the invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

DESCRIPTION OF THE PREFERRED EMBODIMENT

Figure 1:
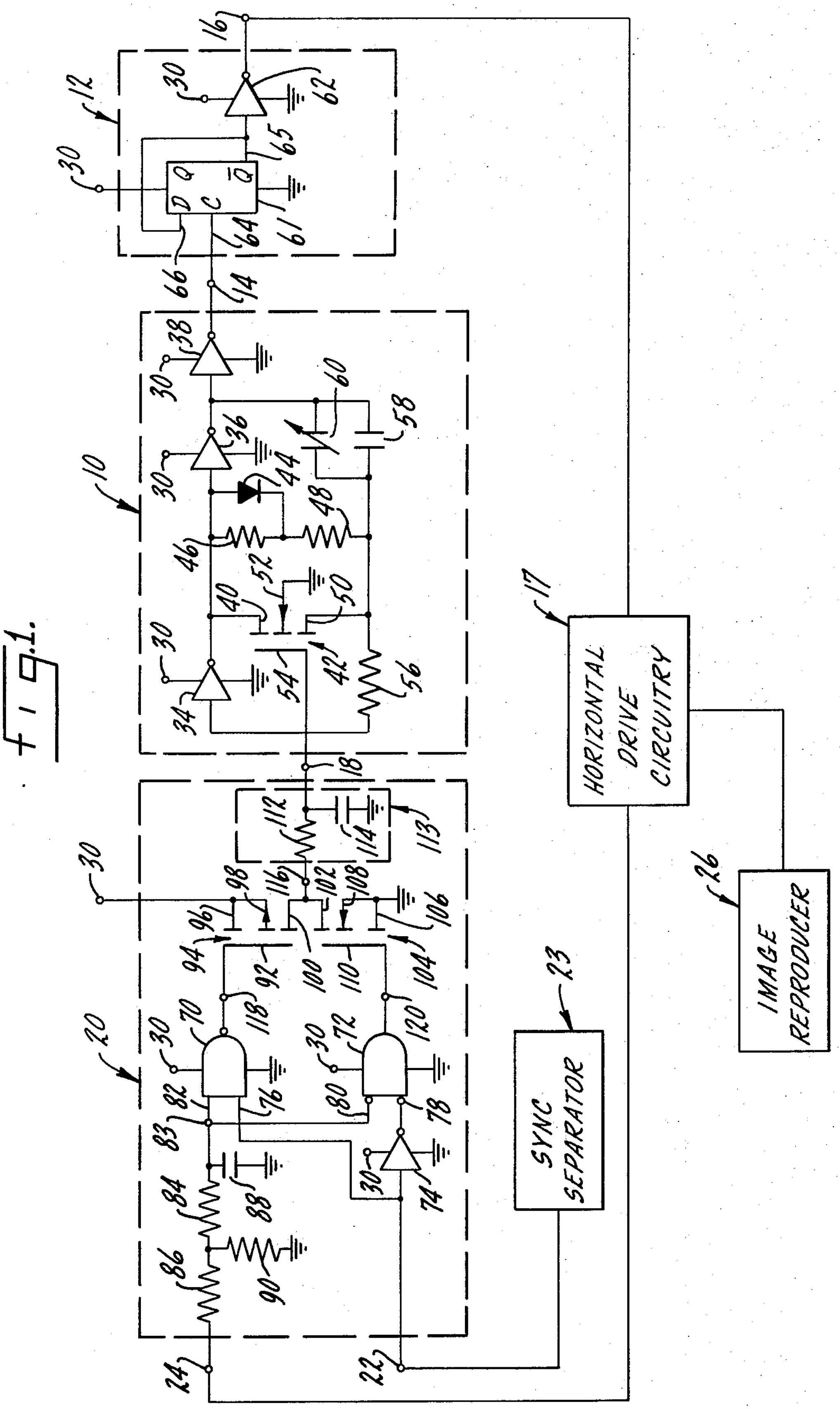
FIG. 1 is an electrical circuit diagram of the invention.

The horizontal oscillator system of FIG. 1, incorporated in a television receiver, includes horizontal oscillator means 10 operating at a frequency *n* x H (where *n* is an integer). The output terminal 14 of oscillator 10 is coupled through a divider-buffer stage 12, dividing by *n* (*n* is 2 in the preferred embodiment), to provide a drive signal at terminal 16 at a frequency H. Terminal 16 is coupled to the input of the horizontal drive circuitry 17 for the receiver. The operating frequency of oscillator 10 is determined by a control voltage developed at the output terminal 18 of a phase comparator 20.

Phase comparator 20 develops the output control voltage, at terminal 18, by comparing the phase of two pulse input waveforms. The first input 22 of comparator 20 receives a horizontal synchronizing pulse signal of frequency H which is derived from the received telecast by means of a sync signal separator 23. The second input 24 of comparator 20 receives a flyback signal, at a frequency H, which is a pulse wave derived from the sweep output of the horizontal drive circuitry 17. The horizontal drive circuitry 17 also controls horizontal scanning in an image reproducer 26. The phase of the flyback pulse at terminal 24 is determined by oscillator 10, since the horizontal drive circuitry 17 derives the flyback pulse from the oscillator waveform appearing at terminal 16.

Oscillator 10 is a voltage-controlled oscillator of the CMOS multi-vibrator type, operating at 31.5 KHz, and includes a voltage source 30 and ground. Three CMOS inverters 34, 36 and 38 are each connected to the supply voltage 30 and ground. The output of inverter 34 is connected to the input of inverter 36 and to the drain lead 40 of an N-channel MOS-FET (Metal-Oxide-Semiconductor Field Effect Transistor). The drain 40 of FET 42 is also connected to the anode of a diode 44 and to one end of a resistor 46. The cathode of diode 44 is connected to the other end of resistor 46 and also to one end of a resistor 48 whose other end is connected to the source lead 50 of FET 42.

The bulk or substrate lead 52 of FET 52 is connected to ground. The gate lead 54 of FET 42 forms the control voltage input of oscillator 10 and is connected to the control voltage input 18. A resistor 56 is connected between the source 50 of FET 42 and the input of inverter 34. The output of inverter 36 is connected to the input of inverter 38. The output of inverter 36 is also connected to the source 50 of FET 42 through the parallel combination of a capacitor 58 and a tunable trimmer capacitor 60. The output of inverter 38 forms the output terminal 14 of oscillator 10.

The divider-buffer stage 12 includes a CMOS D-type flip-flop 61, connected as a divide-by-two stage, and a CMOS inverter gate 62. Flip-flop 61 and inverter 62 are both connected to the supply line 30 and ground. The clock (C) input 64 of flip-flop 61 is connected to the output terminal 14 of oscillator 10. The $\bar{Q}$ output 65 of flip-flop 61 is connected to the input of the inverter 62 and is also returned to the D input 66 of flip-flop 61. The output of inverter 62 forms the output terminal 16 of the divider-buffer stage 12, which drives the horizontal driver circuitry 17 at a frequency H.

Phase comparator 20 includes a positive-logic channel consisting of a NAND gate 70 and a negative-logic channel consisting of an inverter gate 74 and a NAND gate 72. The nomenclature positive- and negative-logic channels is based upon the NAND gates themselves, i.e., negative-logic NAND 72 identifies the negative-logic channel and positive-logic NAND 70 identifies the positive-logic channel. The positive-logic NAND gate 70, the negative-logic NAND gate 72, and the inverter gate 74 are all of the CMOS type, and are connected to the DC supply line 30 and ground. The horizontal synchronizing pulse signal and an attenuated and integrated horizontal flyback signal are each delivered to the inputs of the positive and the negative logic channels. The horizontal sync pulse input 22 is connected to the input of inverter 74 and to one input 76 of NAND gate 70. The output of inverter 74 is connected to one input 78 of NAND gate 72. The second input 80 of NAND gate 72 is connected to the second input 82 of NAND gate 70 at a terminal 83. Input 82 of NAND gate 70 is also connected to the flyback pulse input 24 through the series combination of two resistors 84 and 86.

A capacitor 88 is connected between the input 82 of NAND gate 70 and ground. A resistor 90 is connected between the junction of resistors 84 and 86 to ground. The outputs from the logic channels are connected to an output means for developing a control voltage. The output 118 of NAND gate 70 is connected to the gate lead 92 of a P-channel MOS-FET 94. The source lead 96 and the substrate lead 98 of FET 94 are both connected to supply line 30. The drain lead 100 of FET 94 is connected to the drain lead 102 of an N-channel MOS-FET 104. The source lead 106 and the substrate lead 108 of FET 104 are both connected to ground. The interconnection of drain 100 of FET 94 and drain 102 of FET 104 completes the complementary symmetry arrangement. The gate lead 110 of FET 104 is connected to the output 120 of NAND gate 72. The drain 100 of FET 94 and the drain 102 of FET 104 are connected to the control voltage output terminal 18 through a resistor 112 of a filter network 113. A capacitor 114 of the filter network 113 is connected between the control voltage terminal 18 and ground. It should be noted that filter network 113 might be any general type of filter network and should not be limited to the precise structure shown. The control voltage output is applied to the voltage variable resistance means through lead 54 of FET 42.

In operation, oscillator 10, functioning as an astable multi-vibrator, produces an output frequency at terminal 14 of approximately 31.5 KHz, as determined by the RC time constant of the circuit. The RC time constant of oscillator 10 is determined by capacitors 58 and 60 for the capacitive portion and the parallel combination of the drain to source resistance of FET 42 and the series resistors 46 and 48 for the resistive portion. Diode 44 provides a duty-cycle correction function.

Figure 2:
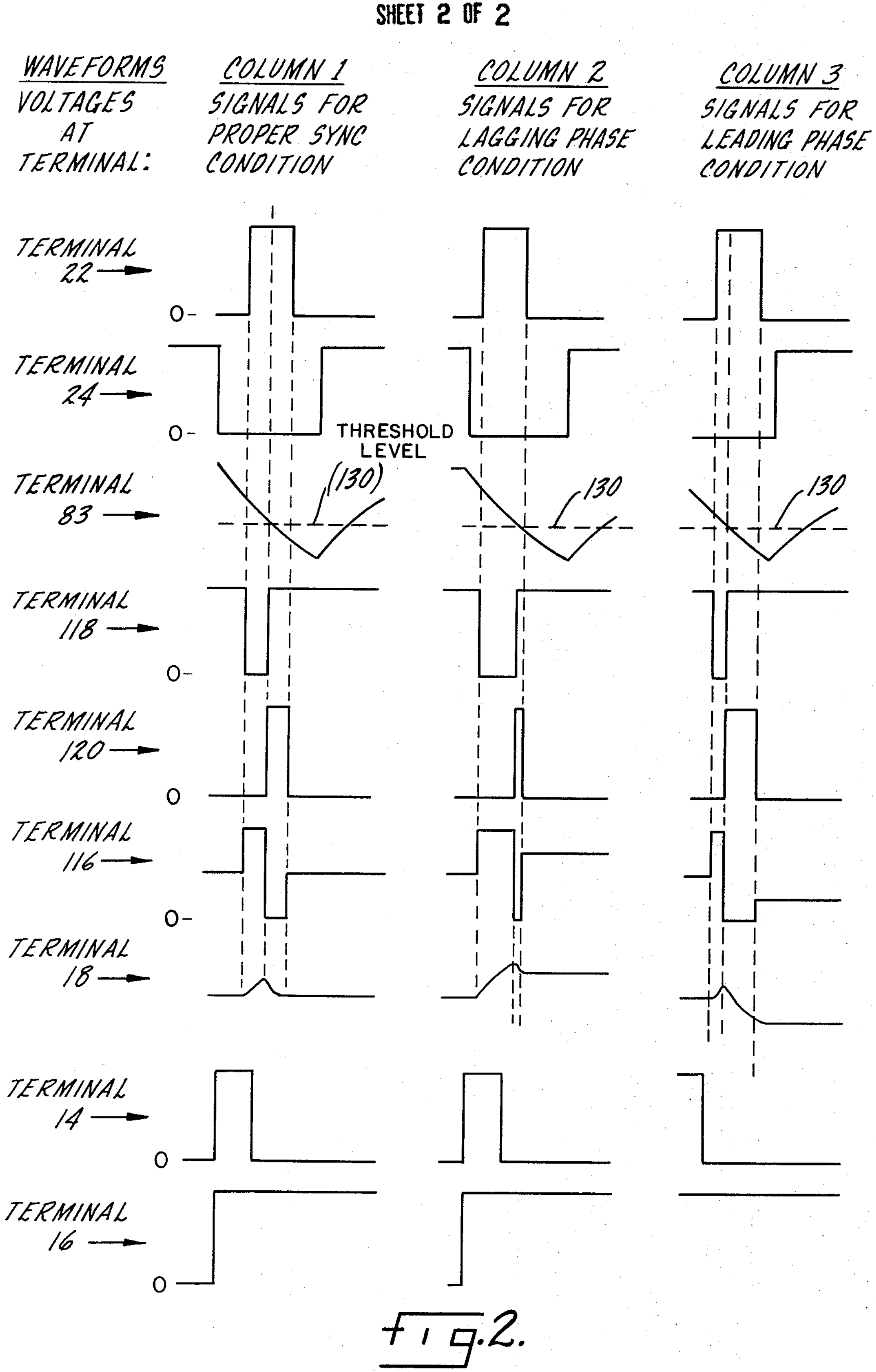
FIG. 2 is a diagrammatic representation of the various waveforms throughout the invention.

The output waveform at terminal 14 is shown in FIG. 2. As the control voltage at terminal 18 is varied by the output of the phase comparator 20, the gate voltage on electrode 54 of FET 42 is also varied. As the gate voltage is varied, the drain to source resistance of FET 42 also changes with a corresponding change in the output frequency terminal at 14 of oscillator 10, since the drain-to-source junction of FET 42 forms a part of the RC time constant. The FET arrangement then constitutes a voltage variable resistance means for varying the operating frequency of the oscillator. The oscillator waveform at terminal 14 may also be used elsewhere in the receiver circuitry such as in a horizontal-vertical countdown circuit.

The output waveform at terminal 14 is then processed through the divider-buffer stage 12 which divides by two to produce the output at terminal 16 (FIG. 2) to the horizontal drive circuitry 17 (FIG. 1) at a frequency of approximately 15.75 KHz. The output waveform at terminal 16 (FIG. 2) has a symmetrical duty cycle.

The flyback pulse applied to input 24 to phase comparator 20 is attenuated and integrated by resistors 84, 86 and 90, along with capacitor 88. The flyback pulse input terminal at 24 and the attenuated and integrated pulse waveform at terminal 83, the input 82 of gate 70, are shown in FIG. 2. The horizontal sync pulse from input 22 is fed to the positive-logic NAND 70, while a negative horizontal sync signal is applied to the negative-logic NAND 72 through inverter 74. The output waveform of NAND gate 70 at terminal 118 in FIG. 2 is low during the portion of the horizontal sync pulse at terminal 22 before the integrated flyback pulse at terminal 83 drops below the threshold 130.

Similarly, the output of NAND gate 72 at terminal 120 is high during the horizontal sync pulse input to terminal 22 after the integrated flyback at inputs 83 and 82 has fallen below the threshold level. When the waveform at terminal 118 and gate 92 of P-channel FET 92 is low, FET 92 is turned on, providing a low impedance path between the supply line 30 and terminal 116 formed by the drain 100 of FET 94 and the drain 102 of FET 104. During this interval when the waveform at terminal 118 is low, the waveform at terminal 116 moves high, toward the voltage of supply line 30. Similarly, when the waveform at electrode 120 of the gate 110 is high, FET 104 is turned on to provide a low impedance path between junction 116 and ground, through the drain-to-source channel. When the waveform at terminal 120 is high, the waveform at terminal 116 then goes low, toward ground. Thus, the integrated control voltage at terminal 18 varies in amplitude in response to changes in relative frequency and phase of the phase comparator input signals.

Column 1 of FIG. 2, showing the waveforms at various terminals in the circuit illustrates the condition when the flyback pulse at input 24 and the horizontal sync pulse at terminal 22 are in proper synchronization. Column 2 in FIG. 2 illustrates the condition where the phase of a flyback pulse at input 24 lags that of the horizontal sync pulse, while the waveforms of Column 3 show the condition where the phase of the flyback pulse at terminal 24 leads that of the horizontal sync pulse at input 22.

The waveform terminal at 116 is integrated by the filter network, resistor 112 and capacitor 114, to produce the applied control voltage at terminal 18. An increased voltage at the control voltage terminal 18 causes a decrease of the resistance in the drain-to-source junction of FET 42, thus effectively lowering the RC time constant of oscillator 10. The lowered or reduced time constant then increases the frequency of the oscillator 10. If the flyback pulse at terminal 24 and the horizontal sync pulse at terminal 22 are in the proper synchronization, as in Column 1 of FIG. 2, the integrated flyback pulse at terminal 83 crosses the threshold voltage level 130 at exactly the midpoint of the horizontal sync pulse. As a result, capacitor 114 charges toward the supply line 30 for one-half the length of the horizontal sync pulse and discharges toward ground for the other half. The effect is to maintain a nearly constant charge across the capacitor 114 at the control voltage terminal 18, as seen in Column 1 of FIG. 2.

If the frequency $n \times H$ of oscillator 10 begins to decrease, the flyback pulses at terminal 24 begin to lag with respect to the horizontal sync pulses at terminal 22, as seen in Column 2 of FIG. 2. This causes the pulse waveform at terminal 118 to be low for a longer period and the pulse at terminal 120 to be shorter. Capacitor 114 charges toward the voltage of supply 30 longer than it discharges toward the ground. The effect is an increase in the charge on capacitor 114 at the control voltage terminal 18, which increases the gate voltage of FET 42 and causes the impedance from drain-to-source of FET 42 to decrease. This decreases the RC time constant, as explained above, and thus increases the oscillator output frequency. By this process, the phase error is corrected to bring the lagging oscillator frequency terminal at 14 back to proper synchronism with the horizontal sync pulse, as shown in Column 1 of FIG. 2.

Similarly, with the phase of the flyback pulse leading that of the horizontal sync pulse, as shown in Column 3 of FIG. 2, the effect is that capacitor 114 discharges toward ground longer than it charges toward the voltage of supply 30, resulting in a decrease in the capacitor charge at control voltage terminal 18. This corresponds to an increase in the impedance of FET 42, with a corresponding decrease in the RC time constant and increase in the oscillator frequency. The decreasing frequency of the oscillator causes the leading phase to be corrected to that of proper synchronism, as in Column 1.

The frequency and phase of oscillator 10 is thus maintained in proper synchronism with the phase of the horizontal sync pulse, applied to terminal 22 from the received carrier with encoded synchronization information by means of the phase control means 20. The horizontal oscillator 10, with associated phase comparator 20, then operates as a phase correction loop to provide a properly synchronized drive signal of frequency H, at terminal 16, free of any noise that may be present on the horizontal sync pulse supplied to the horizontal driver circuitry 17 of the television receiver.

Whereas the preferred form of the invention has been shown and described herein, it should be realized that there may be many modifications, substitutions and alterations thereto, without departing from the teachings of this invention.

What is claimed is:

1. A horizontal oscillator system for a television receiver of the kind comprising synchronizing signal separator means for deriving, from a received telecast, a horizontal synchronizing pulse signal having a horizontal scanning frequency H, horizontal drive means for controlling horizontal scanning in an image reproducer, and a horizontal oscillator for actuating the horizontal drive means in synchronism with the synchronizing pulse signal, said horizontal oscillator comprising:

oscillator means tuned approximately to a given operating frequency and including a voltage-variable resistance means for varying the operating frequency of said oscillator in response to variations in an applied control voltage, said oscillator means being coupled to said horizontal drive means so as to activate said drive means at a frequency H;

a phase comparator including a negative-logic NAND gate defining a negative-logic channel, and a positive-logic NAND gate defining a positive-logic channel, means for modifying and applying a horizontal flyback signal derived from the horizontal drive means to each channel, means for applying said synchronizing pulse signal to each channel in opposite polarity, and output means coupled to the outputs of said channels and combining the output signals therefrom for developing a control voltage varying in amplitude in response to changes in relative frequency and phase between said flyback signal and said synchronizing pulse signal;

and means for applying said control voltage from said phase comparator to said voltage-variable resistance means, the entire horizontal oscillator system being constructed as a single-chip CMOS circuit with external resistors and capacitors implemented by CMOS compatible components.

2. The horizontal oscillator system of claim 1, further comprising divider-buffer means connected at the output of said oscillator means to provide a signal to said horizontal drive circuitry and including frequency divider means, said horizontal oscillator means operating at a frequency of $n$ times the frequency H of said horizontal drive means, said divider means dividing said oscillator operating frequency of $n \times H$ by $n$ to provide the horizontal drive circuitry with a signal of frequency H.

3. The horizontal oscillator system of claim 2, in which the operating frequency H of said horizontal drive means is 15.75 KHz and the division ratio $n$ is 2, said horizontal oscillator means operating at a frequency of 31.5 KHz.

4. The horizontal oscillator system of claim 1 wherein said voltage-variable resistance means comprises a MOS-FET having a gate lead to which said control voltage from said phase comparator is applied, a drain lead and a source lead, the resistance between said drain and source leads being varied to control the operating frequency of said oscillator means.

5. The horizontal oscillator system of claim 1 wherein said output means of said phase comparator includes an N-channel MOS-FET and a P-channel MOS-FET operably connected to form a complementary symmetry pair having the gate lead of said P-channel MOS-FET connected to the output of said positive-logic channel and the gate lead of the N-channel MOS-FET connected to the output of said negative-logic channel.

6. The horizontal oscillator system of claim 5 wherein said output means further includes a filter network operably connected between said complementary symmetry pair and said voltage-variable resistance means.

7. The horizontal oscillator system of claim 3 wherein said voltage-variable resistance means comprises a MOS-FET having a gate lead to which said control voltage from said phase comparator is applied, a drain and a source lead, the resistance between said drain and source leads being varied to control the operating frequency of said oscillator means, and wherein said output means of said phase comparator includes an N-channel MOS-FET and a P-channel MOS-FET operably connected to form a complementary symmetry pair having the gate lead of said P-channel MOS-FET connected to the output of said positive-logic channel and the gate lead of the N-channel MOS-FET connected to the output of said negative-logic channel, said output means further including a filter network operably connected between said complementary symmetry pair of said voltage-variable resistance means.

* * * * *